Aug. 20, 1935.    J. PAVLACK, JR    2,012,202
SINGLE REAR WHEEL ACTION
Filed Sept. 5, 1934    2 Sheets-Sheet 1
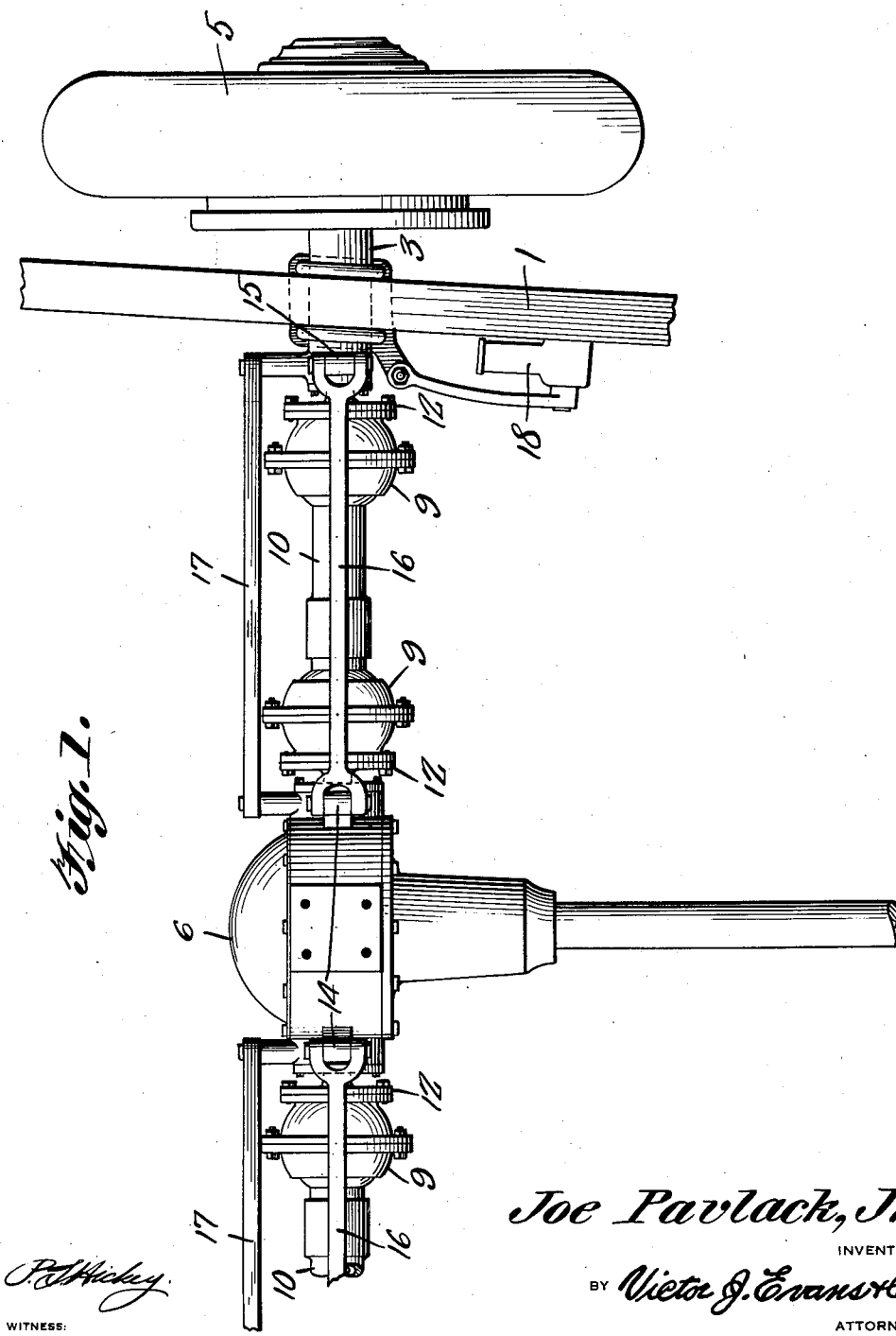
Joe Pavlack, Jr.,
INVENTOR

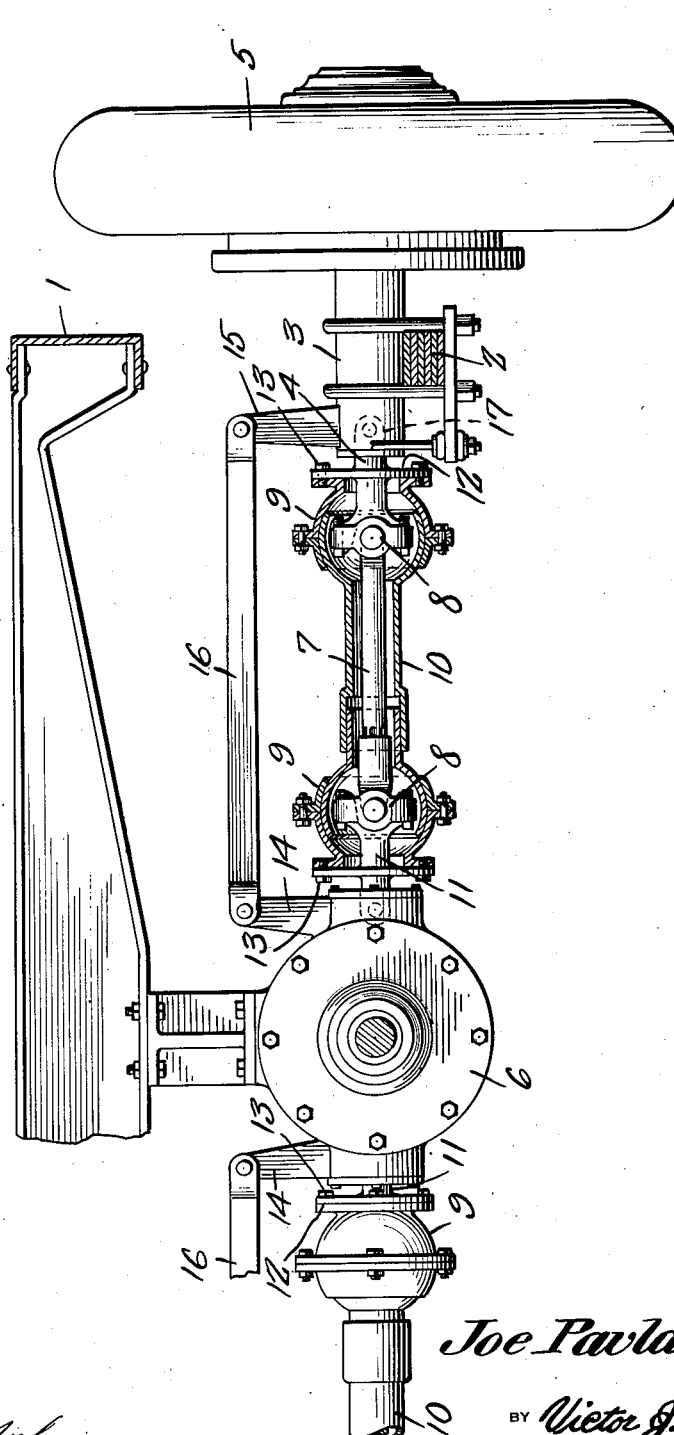

Patented Aug. 20, 1935

2,012,202

UNITED STATES PATENT OFFICE 2,012,202

SINGLE REAR WHEEL ACTION

Joe Pavlack, Jr., Clairton, Pa.

Application September 5, 1934, Serial No. 742,841

1 Claim. (Cl. 180—73)

This invention relates to motor vehicle construction and more particularly to the rear axle assembly and has for the primary object the provision of means for delivering power to the rear wheels and permitting said wheels to move upwardly or downwardly or in a vertical direction independent of each other when passing over irregularities in a roadway, so that the movement of either wheel in said direction will not be transmitted to the other wheel and thereby provide easy and safer riding qualities to the vehicle.

With these and other objects in view this invention consists in certain novel features of construction, combination and arrangement of parts to be hereinafter more fully described and claimed.

For a complete understanding of my invention reference is to be had to the following description and accompanying drawings, in which Figure 1 is a fragmentary plan view illustrating a rear axle assembly for a motor vehicle and constructed in accordance with my invention.

Figure 2 is a fragmentary vertical sectional view illustrating the same.

Referring in detail to the drawings, the numeral 1 indicates a fragmentary portion of a motor vehicle frame having connected thereto by the usual springs 2 comparatively short axle housings 3 and journaled in said axle housings are short axles 4 to which the rear wheels 5 are secured. The differential 6 of the power delivering medium of the vehicle is shown as spaced from the inner ends of the axle housings 3 and interposed between the differential 6 and the axles 4 are power delivering shafts 7 each equipped with universal joints 8. The universal joints 8 are of a conventional construction and the housings 9 thereof are connected by sleeves 10. The inner universal joints are connected to shafts 11 and the latter are connected in the usual way to the differential while the outer universal joints are connected to the axles 4. Plates or flanges 12 are integral with the axles 4 and shafts 11 and are connected to the universal housings 9 by fasteners 13.

Pairs of arms 14 are secured to the differential housing and one arm of each pair is arranged vertically while the other arm of each pair extends horizontally and rearwardly of the differential housing. Pairs of arms 15 are secured to the axle housings 3 and are arranged similarly to the pairs of arms 14. The vertically arranged arms 14 are connected by radius rods 16 while the horizontal arms are connected by radius rods 17. The radius rods referred to are pivotally connected to their respective arms. Arranged on the frame 1 are shock absorbers 18 which are operatively connected to the axle housings 3.

A construction of the character described permits power to be delivered to the wheels 5 from the differential 6 and also permits the axles 4 to move vertically and still remain in substantially horizontal planes when the wheels pass over uneven places in a roadway. This construction also prevents the movement of either wheel from being transmitted to the other wheel.

Having described the invention, I claim:

A rear axle assembly including a motor vehicle frame and a differential, and a housing therefor mounted on the frame, axle housings yieldably connected to the frame, axles journaled in the axle housings and having wheels secured thereto, power delivering shafts located between the axles and the differential, universal joints connecting said shafts to the axles and to the differential, pairs of arms forming on the differential housing and the axle housings and the arms of each pair extending at right angles to one another with one arm disposed vertically and the other arm disposed horizontally and in a rearward direction with respect to the differential housing, and radius rods pivotally connected to the arms of the differential housing and to the arms of the axle housings.

JOE PAVLACK, Jr.